United States Patent
Tu et al.

(10) Patent No.: US 11,750,749 B1
(45) Date of Patent: Sep. 5, 2023

(54) METHOD TO USE NATIVE SCANNING PROPERTIES DIALOG TO SCAN IN SCANNER REDIRECTION

(71) Applicant: VMware, Inc., Palo Alto, CA (US)

(72) Inventors: Zhongzheng Tu, Beijing (CN);
Weigang Huang, Beijing (CN);
Huiyong Huo, Beijing (CN);
Mingsheng Zang, Beijing (CN);
Yueting Zhang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/897,801

(22) Filed: Aug. 29, 2022

(51) Int. Cl.
*G06F 3/12* (2006.01)
*H04N 1/00* (2006.01)

(52) U.S. Cl.
CPC ..... *H04N 1/00082* (2013.01); *H04N 1/00018* (2013.01); *H04N 1/00061* (2013.01); *H04N 1/00079* (2013.01); *H04N 1/00244* (2013.01); *H04N 1/00413* (2013.01); *H04N 1/00482* (2013.01)

(58) Field of Classification Search
CPC ........... H04N 1/00082; H04N 1/00018; H04N 1/00061; H04N 1/00079; H04N 1/00244; H04N 1/00413; H04N 1/00482
See application file for complete search history.

(56) References Cited

U.S. PATENT DOCUMENTS

| | | | |
|---|---|---|---|
| 9,489,471 B2 | 11/2016 | Venkatesh | |
| 10,230,855 B1 | 3/2019 | Sarreo et al. | |
| 10,536,559 B2 | 1/2020 | Vajravel | |
| 2008/0239329 A1 | 10/2008 | Kitada et al. | |
| 2009/0237728 A1 | 9/2009 | Yamamoto | |
| 2010/0223340 A1 | 9/2010 | Pope et al. | |
| 2010/0315675 A1 | 12/2010 | Yagi | |
| 2011/0016475 A1* | 1/2011 | Merna | H04N 1/33346 719/321 |
| 2012/0167208 A1 | 6/2012 | Buford et al. | |
| 2016/0006888 A1 | 1/2016 | Migishima et al. | |
| 2016/0006901 A1 | 1/2016 | Torigoshi et al. | |

(Continued)

OTHER PUBLICATIONS

Dynamsoft "Document Scanner—TWAIN, WIA, ISIS or SANE," Jan. 7, 2020, 8 pages, Retrieved from the Internet Aug. 28, 2022, URL: https://www.dynamsoft.com/blog/insights/document-scanning-twain-wia-isis-sane/.

(Continued)

*Primary Examiner* — Moustapha Diaby
(74) *Attorney, Agent, or Firm* — Kim & Stewart LLP

(57) ABSTRACT

A scanner redirection method for a remote desktop system that includes a client computing device and a host server, includes the steps of: acquiring properties of a physical scanner from a data source; generating a user interface (UI) for the acquired properties of the physical scanner; in response to a first user selection made on the UI, transmitting a request to the physical scanner to update a scanner property that is one of the acquired properties of the physical scanner; and in response to a second user selection made on the UI, receiving from an application running on the host server, a request for a scanned image, transmitting to the data source a request to acquire the scanned image from the physical scanner, and upon receiving the scanned image from the data source, transmitting the scanned image to the application.

20 Claims, 8 Drawing Sheets

(56) References Cited

U.S. PATENT DOCUMENTS

| | | |
|---|---|---|
| 2017/0289313 A1 | 10/2017 | Vajravel |
| 2018/0234517 A1* | 8/2018 | Venkatesh ............. H04L 67/563 |
| 2021/0141579 A1 | 5/2021 | Yuan et al. |
| 2021/0344780 A1 | 11/2021 | Tomes et al. |

OTHER PUBLICATIONS

TWAIN Resource Site—Home Page, 2022, 4 pages, Retrieved from the Internet Aug. 28, 2022, URL: https://twain.org/.
Notice of Allowance dated Mar. 24, 2023 in U.S. Appl. No. 17/897,822, 14 pages.
Non-Final Office Action dated Apr. 17, 2023 in U.S. Appl. No. 17/897,780, 23 pages.
International Search Report and Written Opinion dated May 16, 2023 in International Application No. PCT/US23/11293, 16 pages.

* cited by examiner

METHOD TO USE NATIVE SCANNING PROPERTIES DIALOG TO SCAN IN SCANNER REDIRECTION

CROSS-REFERENCE

This application is based upon and claims the benefit of priority from International Patent Application No. PCT/CN2022/106198, filed on Jul. 18, 2022, the entire contents of which are incorporated herein by reference.

BACKGROUND

Many organizations rely on remote desktop services to provide lean, flexible computing environments. Remote desktop scanning is one important feature required by the end user of a remote desktop service. However, when the source of remote desktop scanning is a client-side scanner, processing of scan commands issued during remote sessions is inefficient and often results in crashes. A robust and efficient method to realize scanner redirection between a client computing device and a host server during a remote session is needed.

SUMMARY

Accordingly, one or more embodiments provide a scanner redirection method for a remote desktop system that includes a client computing device that has running therein a scanner redirection module, and a host server, the scanner redirection module including a data source manager for communicating with a data source that is configured to communicate with a physical scanner. The scanner redirection method includes the steps of: acquiring properties of the physical scanner from the data source; generating a user interface (UI) for the acquired properties of the physical scanner; in response to a first user selection made on the UI, transmitting a request to the physical scanner to update a scanner property that is one of the acquired properties of the physical scanner; and in response to a second user selection made on the UI, receiving from an application running on the host server, a request for a scanned image, transmitting to the data source a request to acquire the scanned image from the physical scanner, and upon receiving the scanned image from the data source, transmitting the scanned image to the application. The scanned image is scanned by the physical scanner according to the scanner property, which has been updated by the physical scanner.

Further embodiments include a non-transitory computer-readable storage medium comprising instructions that cause a remote desktop system to carry out the above method, as well as a remote desktop system configured to carry out the above method.

DETAILED DESCRIPTION

Techniques for realizing scanner redirection between a client computing device and a host server during a remote session are described. A guest operating system (OS) in a virtual machine (VM) of the host server executes an application that requires one or more images to be scanned by a physical scanner that is connected to the client computing device. Accordingly, the application in the VM of the host server requests the image(s) from a module of a remote desktop (RD) client application, referred to as a "scanner redirection module." The scanner redirection module acquires the image(s) from the physical scanner and transmits the image(s) to the application in the VM of the host server.

To realize the described scanner redirection, both the scanner redirection module of the RD client application and the application in the VM of the host server utilize a robust scanning protocol such as the TWAIN protocol. Pursuant to the scanning protocol, the scanner redirection module and the application in the VM of the host server each utilize a "data source manager" and a "data source." For the application in the VM of the host server, the data source manager communicates with a "virtual" data source that requests scanned images from the scanner redirection module. For the scanner redirection module, the data source manager communicates with a data source that is configured to communicate with the physical scanner to acquire scanned images for transmitting to the application in the VM of the host server.

The data sources of the scanner redirection module and the application in the VM of the host server each include user interfaces (UIs) through which a user can adjust scanner properties of physical scanners and begin the scanning of images. However, the UI of the client data source offers the user more capabilities than the UI of the virtual data source of the application in the VM of the host server. The UI of the client data source is implemented by the manufacturer of the physical scanner that the client data source communicates with. On the other hand, the UI of the virtual data source is generated based on requests for scanner properties according to the above-mentioned scanning protocol. The responses from the physical scanner to such requests do not offer as much information as the manufacturer adds to the UI of the client data source. For example, the UI of the client data source may offer a wide range of different resolutions to scan images at, the UI of the virtual data source only offering a subset of the resolutions offered by the UI of the client data source. Accordingly, the UI of the virtual data source is disabled, and the UI of the client data source is enabled. The user adjusts scanner properties and starts scanning through the UI of the client data source. These and further aspects of the invention are discussed below with respect to the drawings.

Figure 1:
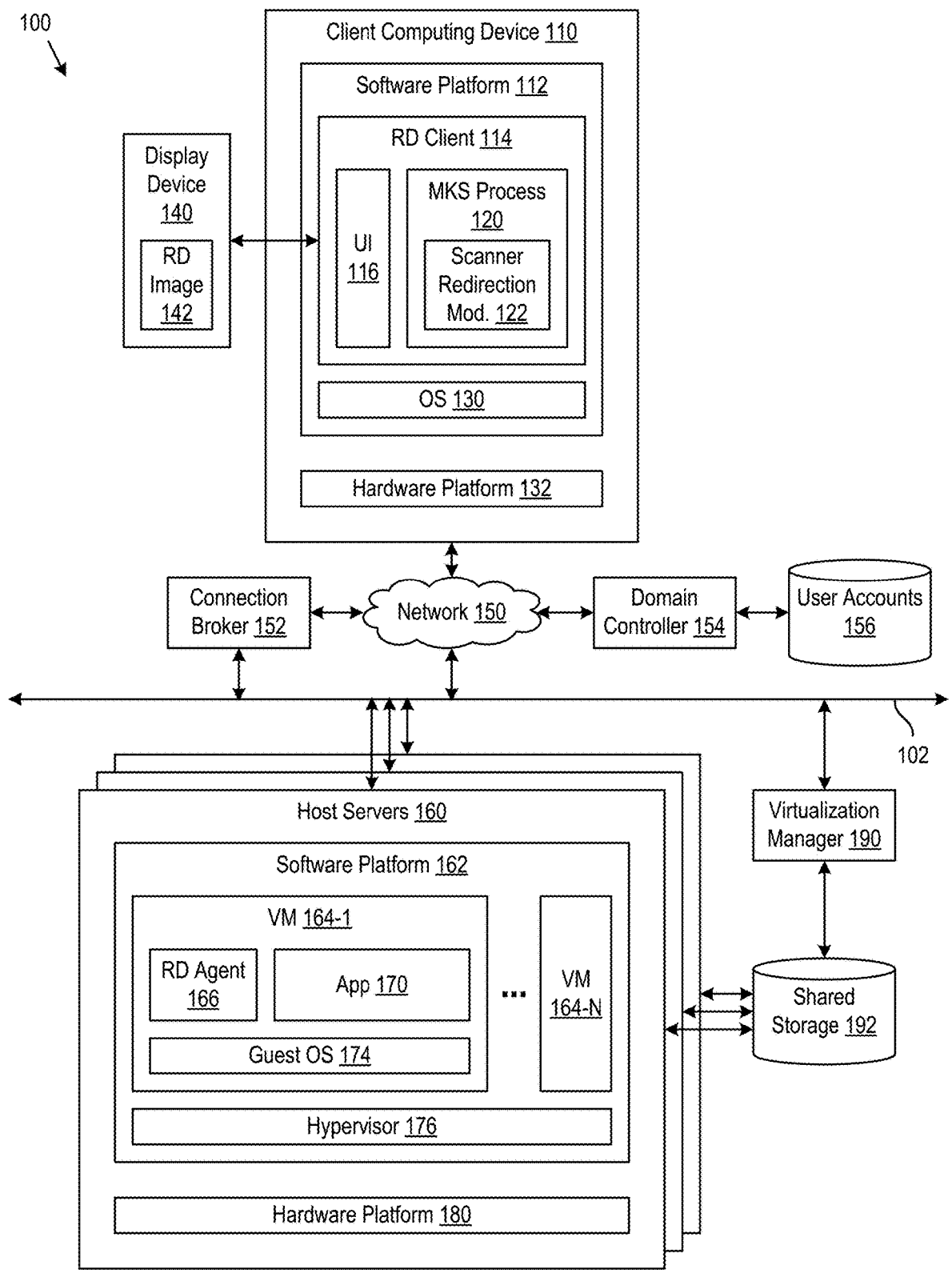
FIG. 1 is a block diagram of a virtualized desktop infrastructure system in which embodiments may be implemented.

FIG. 1 is a block diagram of a virtualized desktop infrastructure (VDI) system 100 (also referred to as an RD computer system) in which scanning according to embodiments may be implemented. VDI system 100 includes a client computing device 110 and a plurality of host servers 160 that are remote from client computing device 110, e.g., in a remote data center. Client computing device 110 is constructed on a hardware platform 132 such as an ×86 architecture platform. Hardware platform 132 includes conventional components (not shown) of a computing device, such as one or more central processing units (CPUs), memory such as random-access memory (RAM), local storage such as one or more magnetic drives or solid-state drives (SSDs), and one or more network interface cards (NICs). The CPU(s) are configured to execute instructions such as executable instructions that perform one or more operations described herein, which may be stored in the memory. The NIC(s) enable client computing device 110 to communicate with host servers 160 over a physical network 150 such as the Internet.

Client computing device 110 includes a software platform 112 on which an RD client software program 114 runs on an OS 130, which is a commodity OS. The term "desktop" refers to the instance of an interactive operating environment provided by an OS and software applications, typically in the form of display and sound output and keyboard and mouse input. With RD client 114, a user accesses an RD that is running in a remote data center, from any location. For example, RD client 114 may be VMware Horizon® client, available from VMware, Inc., or a special purpose thin client such as those available from Dell, HP, NEC, Sun Microsystems, and Wyse. One of host servers 160 transmits an image 142 of an RD to a mouse, keyboard, screen (MKS) process 120 of RD client 114. RD client 114 then communicates with a display device 140 such as a monitor on which the user views RD image 142.

When the user performs actions in the RD such as clicking a mouse or typing on a keyboard, the user's actions are transmitted to MKS process 120. MKS process 120 transmits the user's actions to host server 160 to update the user's RD accordingly. MKS process 120 also includes a scanner redirection module 122 that acquires scanned images from one or more physical scanners (not shown) connected to client computing device 110. The user selects among the physical scanners via a user interface (UI) 116 of RD client 114, and RD client 114 transmits identifications of the selected scanners to scanner redirection module 122. Scanner redirection module 122 transmits such scanned images to host server 160. Scanner redirection module 122 is discussed further below in conjunction with FIG. 2.

VDI system 100 includes a domain controller 154 such as Microsoft Active Directory® that manages user accounts 156 including the user's log-in information for the RD. VDI system 100 also includes a connection broker 152 that manages connections between RD client 114 and a host server running the user's RD. Connection broker 152 and domain controller 154 may run on separate servers or in separate VMs running on the same server or different servers.

In embodiments illustrated herein, RDs are running in VMs 164. VMs 164 are instantiated on a plurality of host servers 160, each of which includes a software platform 162 and a hardware platform 180. Hardware platform 180 is, e.g., a server-grade ×86 architecture platform including the conventional components of a computing device described above for hardware platform 132. Software platform 162 includes a hypervisor 176, which is a virtualization software layer that supports a VM execution space within which VMs 164 are concurrently instantiated and executed. One example of hypervisor 176 is a VMware ESX® hypervisor, available from VMware, Inc.

Each of host servers 160 is controlled by a virtualization manager 190, and hardware platform 180 of each of host servers 160 is coupled to a shared persistent storage system 192. Virtualization manager 190 logically groups host servers 160 into a cluster to perform cluster-level tasks such as provisioning and managing VMs 164 and migrating VMs 164 from one of host servers 160 to another. Virtualization manager 190 communicates with host servers 160 via a management network (not shown) provisioned from a physical network 102 such as a local area network (LAN) of a remote data center. Virtualization manager 190 may be, e.g., a physical server or one of VMs 164. One example of virtualization manager 190 is VMware vCenter Server,® available from VMware, Inc.

VM 164-1 includes an RD agent software program 166 and an application 170 running on a guest OS 174, which is a commodity OS. RD agent 166 communicates with RD client 114 to establish a session for the user's RD. RD image 142 is generated in VM 164-1 and transmitted by RD agent 166 to RD client 114 via MKS process 120 to be displayed on display device 140. Application 170 requires images to be scanned by the physical scanner(s) connected to client computing device 110. Application 170 has been modified to handle scanner redirection with scanner redirection module 122. In one example, application 170 is Adobe Photoshop, which the user is accessing through the RD session. Application 170 is discussed further below in conjunction with FIG. 2. A particular configuration of VDI system 100 is illustrated in FIG. 1, but it should be recognized that one or more embodiments may be practiced with other computer system configurations.

Figure 2:
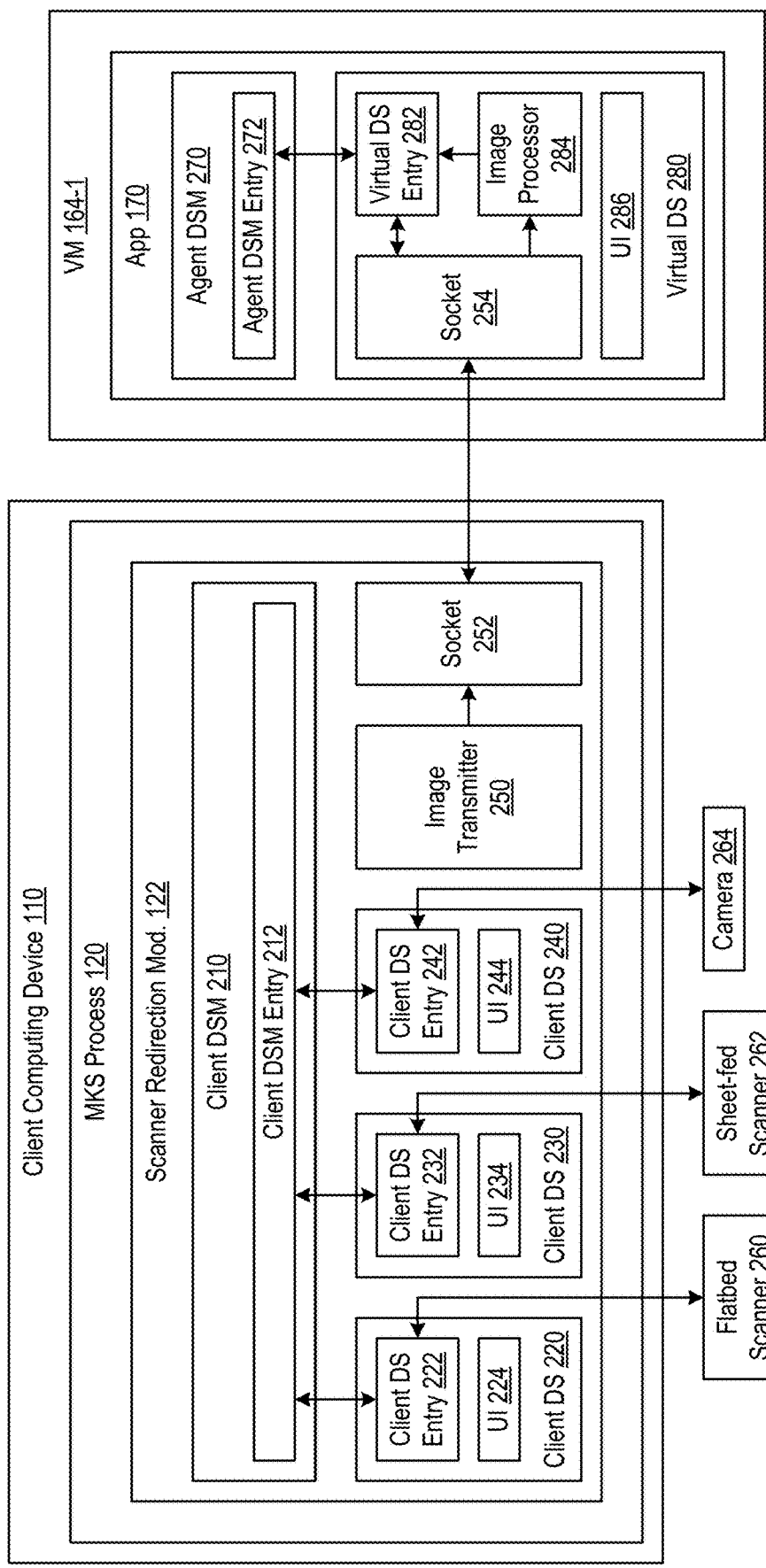
FIG. 2 is a block diagram of a client computing device and a virtual machine running on a host server, of the virtualized desktop infrastructure system.

FIG. 2 is a block diagram illustrating client computing device 110 and VM 164-1 of VDI system 100. Client computing device 110 is connected to three physical scanners: a flatbed scanner 260, a sheet-fed scanner 262, and a camera 264. Scanner redirection module 122 of client computing device 110 includes a client data source manager (DSM) 210 that communicates with client data sources (DSs) 220, 230, and 240. Client DSs 220, 230, and 240 are configured to communicate with flatbed scanner 260, sheet-fed scanner 262, and camera 264, respectively. Although illustrated as communicating directly with the physical scanners, client DSs 220, 230, and 240 may also communicate with separate drivers in OS 130 to acquire scanned images from the physical scanners.

Communication between scanner redirection module 122 and the physical scanners is carried out via client DSM 210 and the client DSs. Specifically, scanner redirection module 122 calls a "client DSM entry" function 212 to transmit commands to client DSM 210. Client DSM 210 calls "client DS entry" functions 222, 232, and 242 to transmit commands to client DSs 220, 230, and 240, respectively. The client DSs also return results to client DSM 210 via return values of client DS entry calls. Similarly, client DSM 210 provides results via return values of client DSM entry 212 calls.

Client DSs 220, 230, and 240 have UIs 224, 234, and 244 for adjusting scanner properties of physical scanners and beginning the scanning of images. UIs 224, 234, and 244 are also referred to herein as "native UIs." When one of the client DSs acquires a scanned image from a respective physical scanner, the client DS returns the scanned image to client DSM 210 to be further transmitted to an image transmitter 250. Image transmitter 250 transmits the scanned image to application 170 of VM 164-1 via sockets 252 and 254 of scanner redirection module 122 and application 170, respectively.

Application 170 includes an agent DSM 270 that communicates with a virtual DS 280 to request scanned images. Virtual DS 280 is configured to communicate with scanner redirection module 122 to acquire scanned images from the physical scanners. Application 170 calls an "agent DSM entry" function 272 to transmit commands to agent DSM 270. Agent DSM 270 calls a "virtual DS entry" function 282 to transmit commands to virtual DS 280. Virtual DS 280 also returns results to agent DSM 270 via return values of virtual DS entry 282 calls. Similarly, agent DSM 270 provides results via return values of agent DSM entry 272 calls. Virtual DS 280 has a UI 286 for allowing the user to adjust scanner properties of physical scanners and begin scanning images. However, according to embodiments, UI 286 is disabled to instead present UIs 224, 234, and 244 to a user. Accordingly, the user can perform such actions via UIs 224, 234, and 244 while UI 286 is disabled.

As previously mentioned, application 170 receives scanned images from scanner redirection module 122 via sockets 252 and 254. Specifically, the scanned images are received by an image processor 284 of virtual DS 280 that renders the scanned images, e.g., rotating upside-down images so that they face right-side-up. Image processor 284 returns scanned images to virtual DS 280, which returns the scanned images to agent DSM 270 to be further returned to application 170.

Figure 3:
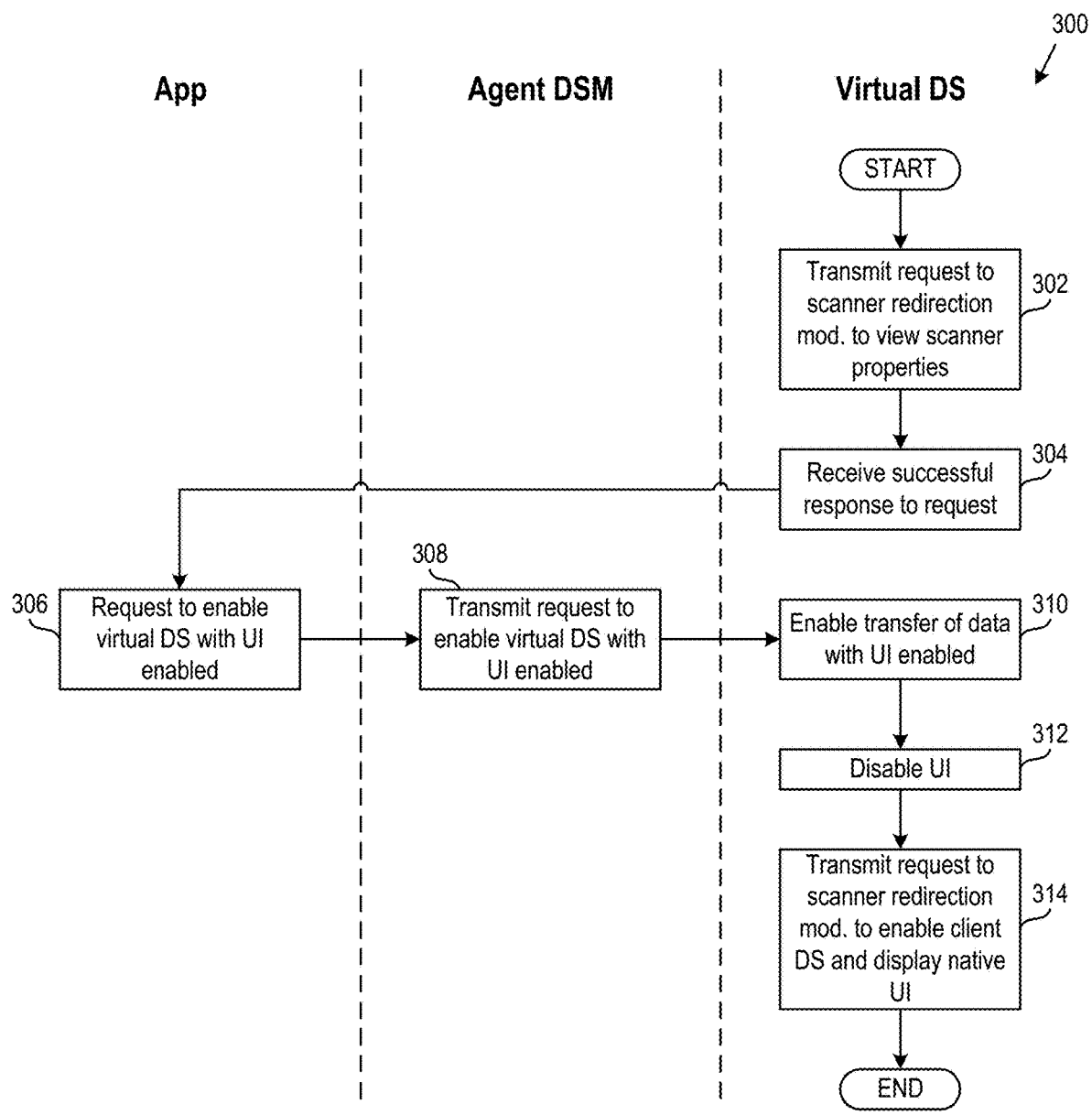
FIG. 3 is a flow diagram of steps performed by an application of the virtual machine to carry out a method of enabling a data source of the application with a disabled user interface, according to an embodiment.

FIG. 3 is a flow diagram of steps performed by application 170 of VM 164-1 to carry out a method 300 of enabling virtual DS 280 with UI 286 disabled, according to an embodiment. At step 302, virtual DS 280 transmits a request to scanner redirection module 122 via sockets 252 and 254, to view scanner properties. At step 304, virtual DS 280 receives a successful response to the request to view scanner properties, e.g., a Boolean value indicating that scanner redirection module 122 has successfully retrieved scanner properties.

At step 306, application 170 calls agent DSM entry 272 to request agent DSM 270 to enable virtual DS 280 with UI 286 enabled, UI 286 being disabled later, as discussed below. At step 308, agent DSM 270 calls virtual DS entry 282 to transmit a request to virtual DS 280 to enable with UI 286 enabled, which is the default manner through which virtual DS 280 enables itself. At step 310, virtual DS 280 enables itself with UI 286 enabled, at which point virtual DS 280 is available to assist agent DSM 270 in transmitting commands to scanner redirection module 122 via sockets 252 and 254. At step 312, virtual DS 280 disables UI 286 because UIs 224, 234, and 244 will be used instead for adjusting properties of the physical scanners and beginning scanning. For example, the user may designate via UI 116 of RD client 114 to use the native UIs of client DSs, and scanner redirection module 122 transmits a message to application 170 to disable UI 286. At step 314, virtual DS 280 transmits a request to scanner redirection module 122 via sockets 252 and 254 to enable one of the client DSs and to display the native UI thereof.

Figure 4:
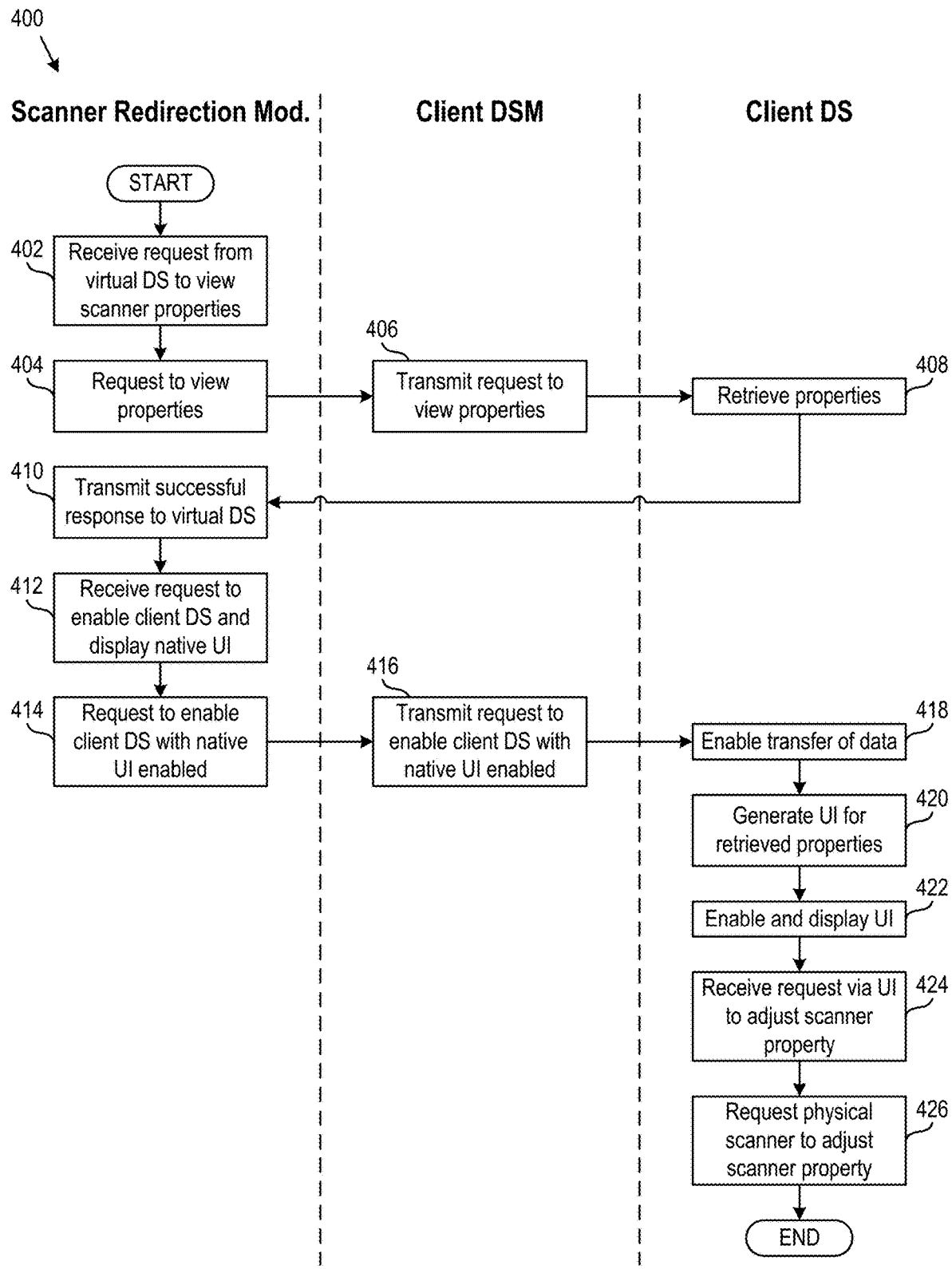
FIG. 4 is a flow diagram of steps performed by a scanner redirection module of the client computing device to carry out a method of enabling a data source of the client computing device with an enabled user interface and adjusting a scanner property via the enabled user interface, according to an embodiment.

FIG. 4 is a flow diagram of steps performed by scanner redirection module 122 of client computing device 110 to carry out a method 400 of enabling a data source with an enabled UI and adjusting a scanner property via the enabled UI, according to an embodiment. At step 402, scanner redirection module 122 receives a request from virtual DS 280 via sockets 252 and 254 to view scanner properties. For example, method 400 will be discussed with reference to flatbed scanner 260, which the user previously designated via UI 116, scanner redirection module 122 having then received an identification of flatbed scanner 260 from RD client 114. At step 404, scanner redirection module 122 calls client DSM entry 212 to request client DSM 210 to view properties of flatbed scanner 260.

At step 406, client DSM 210 calls client DS entry 222 to transmit a request to client DS 220 to view properties of flatbed scanner 260. At step 408, client DS 220 retrieves a list of properties from flatbed scanner 260. For example, the properties may indicate possible resolutions for scanned images and being able to scan in simplex or duplex, and grey or color modes. At step 410, scanner redirection module 122 transmits to virtual DS 280 a successful response to the request to view scanner properties, e.g., a Boolean value indicating success. At step 412, scanner redirection module 122 receives a request from virtual DS 280 to enable a client DS and display the native UI thereof. At step 414, scanner redirection module 122 calls client DSM entry 212 to request client DSM 210 to enable client DS 220 with UI 224 enabled. At step 416, client DSM 210 calls client DS entry 222 to transmit a request to client DS 220 to enable with UI 224 enabled.

At step 418, client DS 220 enables the transfer of data from flatbed scanner 260. At step 420, client DS 220 generates UI 224 for the properties retrieved at step 408. At step 422, client DS 220 enables and displays UI 224 on display device 140. At step 424, client DS 220 receives a request via UI 224 to adjust one of the scanner properties displayed on UI 224, which is one of the scanner properties retrieved at step 408. At step 426, client DS 220 transmits a request to flatbed scanner 260 to adjust the scanner property. After step 426, method 400 ends. Client DS 220 may receive additional requests to adjust scanner properties, at which points step 426 is repeated for the additional requests. On the other hand, although illustrated as step 422 moving to step 424, if client DS 220 does not receive any requests to adjust scanner properties, method 400 ends after step 422.

Figure 5:
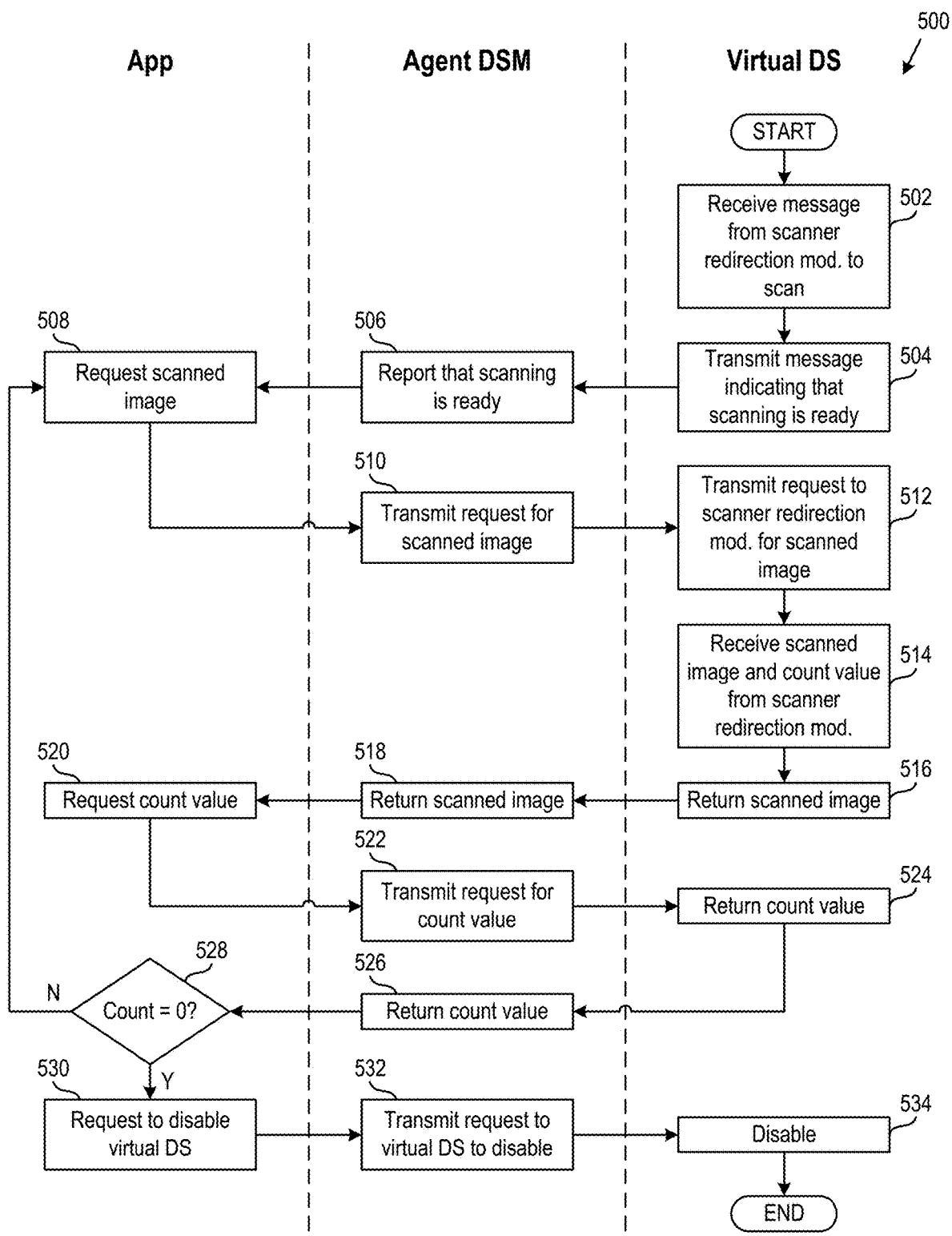
FIG. 5 is a flow diagram of steps performed by the application of the virtual machine to carry out a method of acquiring one or more scanned images from the scanner redirection module of the client computing device, according to an embodiment.

FIG. 5 is a flow diagram of steps performed by application 170 of VM 164-1 to carry out a method 500 of acquiring one or more scanned images from scanner redirection module 122 of client computing device 110, according to an embodiment. At step 502, virtual DS 280 receives a message from scanner redirection module 122 indicating that the user has selected to scan one or more images. At step 504, virtual DS 280 transmits a message to agent DSM 270 indicating that scanning is ready. At step 506, agent DSM 270 reports to application 170 that scanning is ready.

At step 508, application 170 calls agent DSM entry 272 to request a scanned image from agent DSM 270. At step 510, agent DSM 270 calls virtual DS entry 282 to transmit a request to virtual DS 280 for the scanned image. At step 512, virtual DS 280 transmits a request for the scanned image to scanner redirection module 122 via sockets 252 and 254. At step 514, virtual DS 280 receives the scanned image and a "count" value from scanner redirection module 122 via sockets 252 and 254. Count is a variable indicating whether there are any pending scanned images yet to be retrieved from a physical scanner. A count value of zero indicates that there are no pending scanned images, while a nonzero count value indicates that there is at least one pending scanned image.

At step 516, virtual DS 280 transmits the scanned image to agent DSM 270 as a return value of the call to virtual DS entry 282 at step 510. Virtual DS 280 also stores the count value in memory of hardware platform 180 for later. At step 518, agent DSM 270 returns the scanned image as a return value of the call to agent DSM entry 272 at step 508. At step 520, application 170 calls agent DSM entry 272 to request agent DSM 270 for the count value. At step 522, agent DSM 270 calls virtual DS entry 282 to transmit a request to virtual DS 280 for the count value. At step 524, virtual DS 280 retrieves the count value from memory and transmits the count value to agent DSM 270 as a return value of the call to virtual DS entry 282 at step 522. At step 526, agent DSM 270 reports the count value as a return value of the call to agent DSM entry 272 at step 520.

At step 528, application 170 checks if the count value is zero. If the count value is nonzero, method 500 returns to step 508, and application 170 calls agent DSM entry 272 to request another scanned image from agent DSM 270. Otherwise, if the count value is zero, method 500 moves to step 530. At step 530, application 170 calls agent DSM entry 272 to request agent DSM 270 to disable virtual DS 280. At step 532, agent DSM 270 calls virtual DS entry 282 to transmit a request to virtual DS 280 to disable. At step 534, virtual DS 280 disables itself such that it is no longer available to assist agent DSM 270 in transmitting commands to scanner redirection module 122 via sockets 252 and 254. After step 534, method 500 ends.

Figure 6:
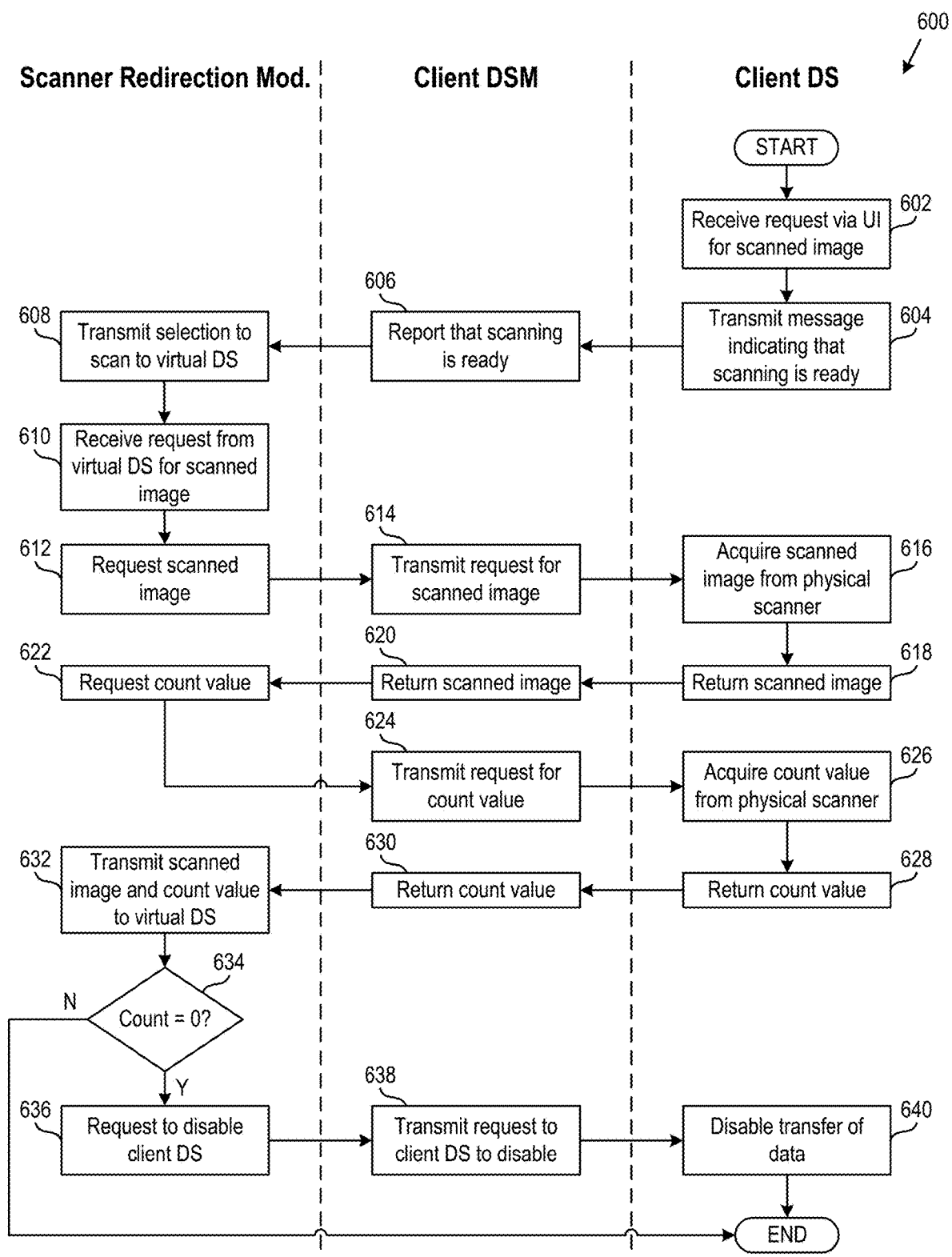
FIG. 6 is a flow diagram of steps performed by the scanner redirection module of the client computing device to carry out a method of acquiring one or more scanned images from the physical scanner, according to an embodiment.

FIG. 6 is a flow diagram of steps performed by scanner redirection module 122 of client computing device 110 to carry out a method 600 of acquiring one or more scanned images from a physical scanner, according to an embodiment. For example, method 600 will be discussed with respect to sheet-fed scanner 262, which the user previously designated via UI 116, scanner redirection module 122 having then received an identification of sheet-fed scanner 262 from RD client 114.

At step 602, client DS 230 receives a request for a scanned image via UI 234. At step 604, client DS 230 transmits a message to client DSM 210 indicating that scanning is ready. At step 606, client DSM 210 reports to scanner redirection module 122 that scanning is ready. At step 608, scanner redirection module 122 transmits a message to virtual DS 280 indicating that the user has selected to scan.

At step 610, scanner redirection module 122 receives a request from virtual DS 280 for a scanned image. At step 612, scanner redirection module 122 calls client DSM entry 212 to request client DSM 210 for a scanned image. At step 614, client DSM 210 calls client DS entry 232 to transmit a request to client DS 230 for the scanned image. At step 616, client DS 230 acquires the scanned image from sheet-fed scanner 262. At step 618, client DS 230 transmits the scanned image to client DSM 210 as a return value of the call to client DS entry 232 at step 614. At step 620, client DSM 210 reports the scanned image as a return value of the call to client DSM entry 212 at step 612.

At step 622, scanner redirection module 122 calls client DSM entry 212 to request client DSM 210 for a count value. At step 624, client DSM 210 calls client DS entry 232 to transmit a request to client DS 230 for the count value. At step 626, client DS 230 acquires the count value from sheet-fed scanner 262. At step 618, client DS 230 transmits the count value to client DSM 210 as a return value of the call to client DS entry 232 at step 624. At step 630, client DSM 210 reports the count value as a return value of the call to client DSM entry 212 at step 622.

At step 632, scanner redirection module 122 transmits the scanned image and count value to virtual DS 280 via sockets 252 and 254. At step 634, if the count value is nonzero, which indicates the availability of at least one more scanned image from sheet-fed scanner 262, method 600 ends, and steps 610 to 634 are repeated each time virtual DS 280 transmits a request for a scanned image to scanner redirection module 122 via sockets 252 and 254. Otherwise, if the count value equals zero, which indicates that there are no more scanned images available from sheet-fed scanner 262, method 600 moves to step 636. At step 636, scanner redirection module 122 calls client DSM entry 212 to request client DSM 210 to disable client DS 230. At step 638, client DSM 210 calls client DS entry 232 to transmit a request to client DS 230 to disable. At step 640, client DS 230 disables the transfer of data from sheet-fed scanner 262. After step 640, method 600 ends.

Figure 7A:
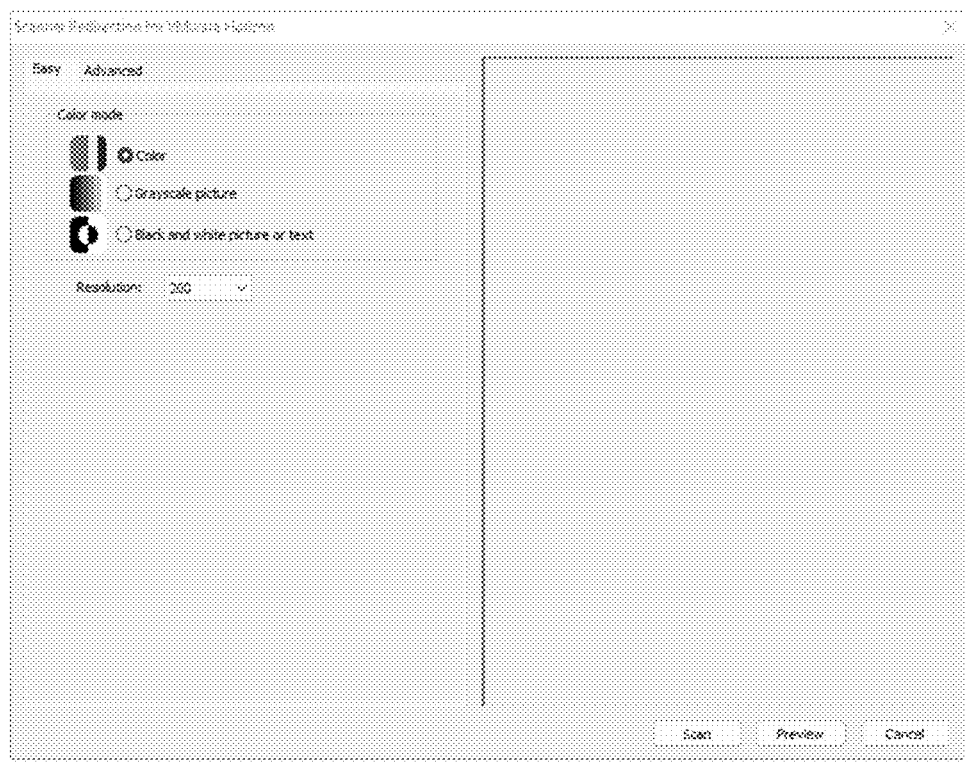
FIGS. 7A-7B illustrate an example user interface of the virtual machine.
Figure 7B:
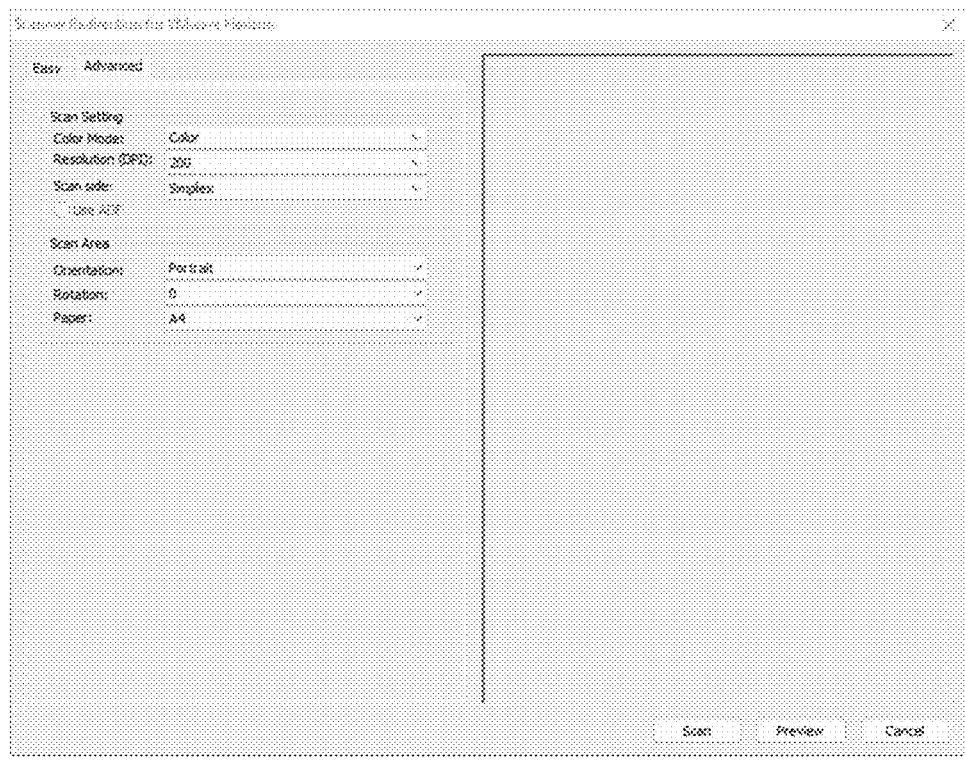

FIGS. 7A-7B illustrate an example of UI 286 of virtual DS 280. FIG. 7A, which illustrates an "easy" section of a scanning settings dialog of UI 286, allows the user to adjust the color mode and resolution for scanning images. FIG. 7B, which illustrates an "advanced" section of the scanning settings dialog, allows the user to adjust additional scanner properties, including to select simplex or duplex mode and to select portrait or landscape mode. The scanning settings dialog is generated based on requests for scanner properties according to the scanning protocol of application 170.

Figure 8B:
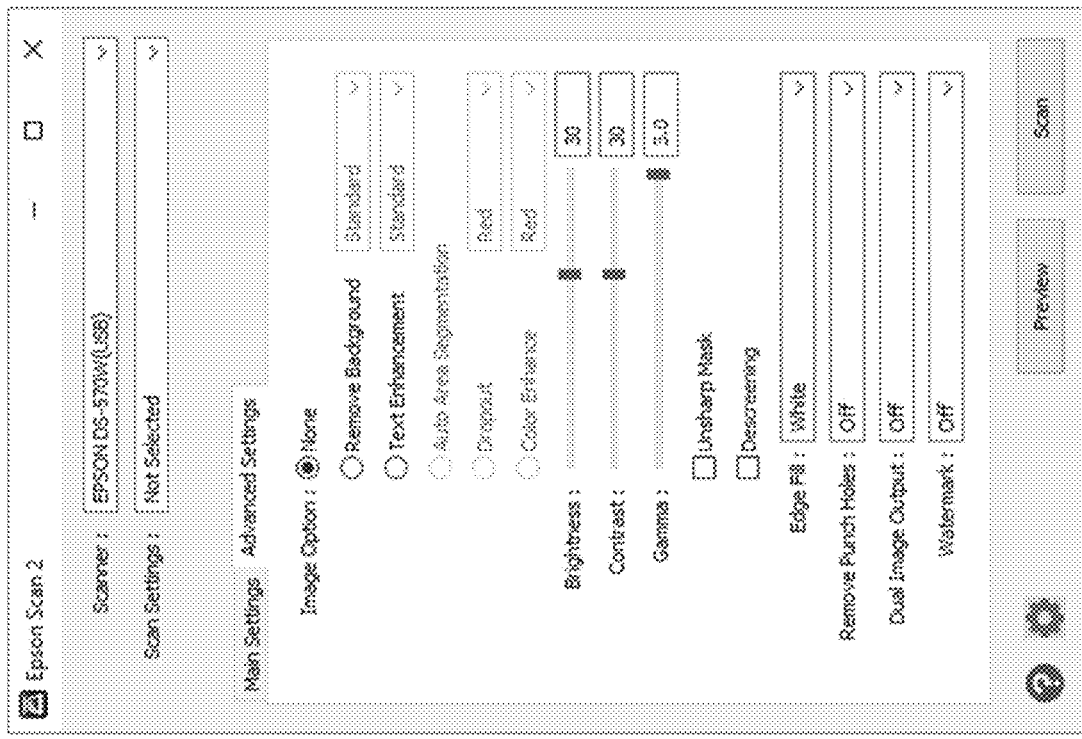
FIGS. 8A-8B illustrate an example user interface of the client computing device.
Figure 8A:
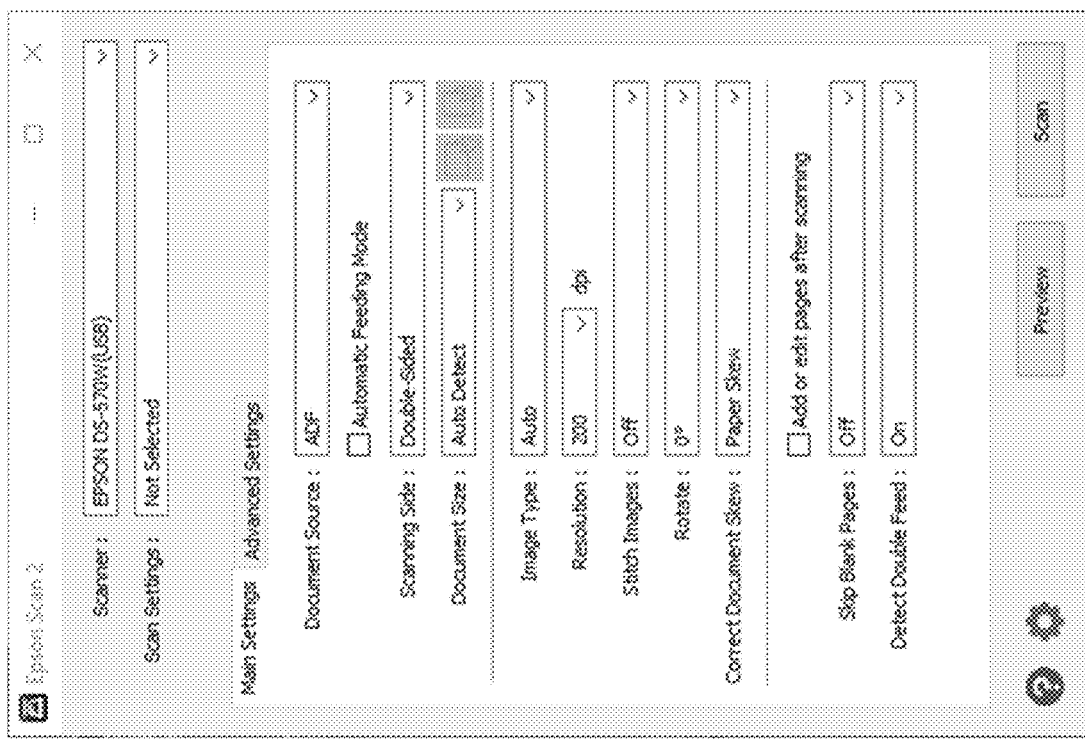

FIGS. 8A-8B illustrate an example of a native UI of one of the client DSs of scanner redirection module 122. FIG. 8A, which illustrates a "main settings" section of a scanning settings dialog of the native UI, allows the user to adjust several scanner properties, including to select whether to scan in simplex or duplex ("double-sided") mode, to adjust the resolution for scanning images, and to select whether to skip blank pages while scanning. FIG. 7B, which illustrates an "advanced settings" section of the scanning settings dialog, allows the user to adjust several additional scanner properties, including to adjust the brightness, contrast, and gamma of scanned images. The scanning settings dialog is implemented by the manufacturer of the physical scanner that the client DS communicates with. As illustrated, the scanning settings dialog of the native UI of the client DS, illustrated in FIGS. 8A and 8B, presents the user with more information than UI 286 of virtual DS 280, illustrated in FIGS. 7A and 7B. The user is thus able to adjust more scanner properties via the native UI. Furthermore, for common options such as to adjust resolution, the native UI may offer a wider selection of choices.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are hard disk drives (HDDs), SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A scanner redirection method for a remote desktop system that includes a client computing device that has running therein a scanner redirection module, and a host server, the scanner redirection module including a data source manager for communicating with a data source that is configured to communicate with a physical scanner, the scanner redirection method comprising:
    acquiring properties of the physical scanner from the data source;
    generating a user interface (UI) for the acquired properties of the physical scanner;
    in response to a first user selection made on the UI, transmitting a request to the physical scanner to update a scanner property that is one of the acquired properties of the physical scanner; and
    in response to a second user selection made on the UI, receiving from an application running on the host server, a request for a scanned image, transmitting to the data source a request to acquire the scanned image from the physical scanner, and upon receiving the scanned image from the data source, transmitting the scanned image to the application, wherein the scanned image is scanned by the physical scanner according to the scanner property, which has been updated by the physical scanner.

2. The scanner redirection method of claim 1, further comprising:
    in response to the second user selection made on the UI and prior to the receiving from the application of the request for the scanned image, transmitting a message to the application indicating that the user has selected to scan.

3. The scanner redirection method of claim 1, further comprising:
    after the receiving of the scanned image from the data source, determining that there are no more scanned images available from the physical scanner; and
    in response to the determining that there are no more scanned images available, transmitting a message to the application indicating that there are no more scanned images available.

4. The scanner redirection method of claim 3, further comprising:
    in response to the determining that there are no more scanned images available, disabling the transfer of data from the physical scanner.

5. The scanner redirection method of claim 1, further comprising:
    after the receiving of the scanned image from the data source, determining that there is another scanned image available from the physical scanner; and
    in response to the determining that there is another scanned image available, transmitting a message to the application indicating the availability of the other scanned image.

6. The scanner redirection method of claim 1, wherein the acquired properties of the physical scanner include a resolution for scanning images, scanning in a simplex mode or a duplex mode, and scanning in a grey mode or a color mode.

7. The scanner redirection method of claim 1, wherein the UI for the acquired properties of the physical scanner is a UI of the client computing device, which is separate from a UI of the application through which the user can select among the properties of the physical scanner to adjust.

8. A non-transitory computer-readable medium comprising instructions that are executable in a remote desktop system that includes a client computing device that has running therein a scanner redirection module, and a host server, the scanner redirection module including a data source manager for communicating with a data source that is configured to communicate with a physical scanner, wherein the instructions when executed cause the remote desktop system to carry out a scanner redirection method comprising:
- acquiring properties of the physical scanner from the data source;
- generating a user interface. (UI) for the acquired properties of the physical scanner;
- in response to a first user selection made on the transmitting a request to the physical scanner to update a scanner property that is one of the acquired properties of the physical scanner; and
- in response to a second user selection made on the UI, receiving from an application running on the host server, a request for a scanned image, transmitting to the data source a request to acquire the scanned image from the physical scanner, and upon receiving the scanned image from the data source, transmitting the scanned image to the application, wherein the scanned image is scanned by the physical scanner according to the scanner property, which has been updated by the physical scanner.

9. The non-transitory computer-readable medium of claim 8, the scanner redirection method further comprising:
- in response to the second user selection made on the UI and prior to the receiving from the application of the request for the scanned image, transmitting a message to the application indicating that the user has selected to scan.

10. The non-transitory computer-readable medium of claim 8, the scanner redirection method further comprising:
- after the receiving of the scanned image from the data source, determining that there are no more scanned images available from the physical scanner; and
- in response to the determining that there are no more scanned images available, transmitting a message to the application indicating that there are no more scanned images available.

11. The non-transitory computer-readable medium of claim 10, the scanner redirection method further comprising:
- in response to the determining that there are no more scanned images available, disabling the transfer of data from the physical scanner.

12. The non-transitory computer-readable medium of claim 8, the scanner redirection method further comprising:
- after the receiving of the scanned image from the data source, determining that there is another scanned image available from the physical scanner; and
- in response to the determining that there is another scanned image available, transmitting a message to the application indicating the availability of the other scanned image.

13. The non-transitory computer-readable medium of claim 8, wherein the acquired properties of the physical scanner include a resolution for scanning images, scanning in a simplex mode or a duplex mode, and scanning in a grey mode or a color mode.

14. The non-transitory computer-readable medium of claim 8, wherein the UI for the acquired properties of the physical scanner is a UI of the client computing device, which is separate from a UI of the application through which the user can select among the properties of the physical scanner to adjust.

15. A remote desktop system comprising:
- a host server; and
- a client computing device that has running therein a scanner redirection module, the scanner redirection module including a data source manager for communicating with a data source that is configured to communicate with a physical scanner, and the scanner redirection module being configured to:
  - acquire properties of the physical scanner from the data. source;
  - generate a user interface (UI) for the acquired properties of the physical scanner;
  - in response to a first user selection made on the UI, transmit a request to the physical scanner to update a scanner property that is one of the acquired properties of the physical scanner; and
  - in response to a second user selection made on the UI, receive from an application running on the host server, a request for a scanned image, transmit to the data. source a request to acquire the scanned image from the physical scanner, and upon receiving the scanned image from the data source, transmit the scanned image to the application, wherein the scanned image is scanned by the physical scanner according to the scanner property, which has been updated by the physical scanner.

16. The remote desktop system of claim 15, the scanner redirection module being further configured to:
- in response to the second user selection made on the UI and prior to the receiving from the application of the request for the scanned image, transmit a message to the application indicating that the user has selected to scan.

17. The remote desktop system of claim 15, the scanner redirection module being further configured to:
- after the receiving of the scanned image from the data source, determine that there are no more scanned images available from the physical scanner; and
- in response to the determining that there are no more scanned images available, transmit a message to the application indicating that there are no more scanned images available.

18. The remote desktop system of claim 15, the scanner redirection module being further configured to:
- after the receiving of the scanned image from the data source, determine that there is another scanned image available from the physical scanner; and
- in response to the determining that there is another scanned image available, transmit a message to the application indicating the availability of the other scanned image.

19. The remote desktop system of claim 15, wherein the acquired properties of the physical scanner include a resolution for scanning images, scanning in a simplex mode or a duplex mode, and scanning in a grey mode or a color mode.

20. The remote desktop system of claim 15, wherein the UI for the acquired properties of the physical scanner is a UI of the client computing device, which is separate from a UI of the application through which the user can select among the properties of the physical scanner to adjust.

* * * * *